US012055267B2

(12) United States Patent
Ahn (10) Patent No.: US 12,055,267 B2
(45) Date of Patent: Aug. 6, 2024

(54) COMPOSITE INNER FRAME MULTI-BONDED BARREL, SHELL-INTEGRATED PROJECTILE PROPELLANT TANK INCLUDING SAME, AND METHOD FOR MANUFACTURING THOSE

(71) Applicant: ANH Structure Co., Ltd., Jinju-si (KR)

(72) Inventor: Hyonsu Ahn, Jinju-si (KR)

(73) Assignee: ANH Structure Co., Ltd., Jinju-si (KR)

( * ) Notice: Subject to any disclaimer, the term of this patent is extended or adjusted under 35 U.S.C. 154(b) by 634 days.

(21) Appl. No.: 17/263,744

(22) PCT Filed: Oct. 7, 2020

(86) PCT No.: PCT/KR2020/013625
§ 371 (c)(1),
(2) Date: Jan. 27, 2021

(87) PCT Pub. No.: WO2021/071225
PCT Pub. Date: Apr. 15, 2021

(65) Prior Publication Data
US 2022/0026022 A1 Jan. 27, 2022

(30) Foreign Application Priority Data
Oct. 10, 2019 (KR) .................. 10-2019-0125662

(51) Int. Cl.
*F17C 1/02* (2006.01)
*B29C 70/30* (2006.01)
(Continued)

(52) U.S. Cl.
CPC ................ *F17C 1/02* (2013.01); *B64G 1/402* (2013.01); *F17C 13/008* (2013.01); *B29C 70/30* (2013.01);
(Continued)

(58) Field of Classification Search
CPC .. F17C 1/02; F17C 13/008; F17C 2201/0109; F17C 2203/012; F17C 2203/0663;
(Continued)

(56) References Cited

U.S. PATENT DOCUMENTS 3,274,671 A * 9/1966 Hauer .................... B21K 21/00
220/4.12
3,372,075 A * 3/1968 Holt .......................... F17C 3/02
428/116
(Continued)

FOREIGN PATENT DOCUMENTS

CN 109911247 A * 6/2019
DE 1243054 B * 6/1967
(Continued)

OTHER PUBLICATIONS

English Machine Translation of DE-1243054-B (Year: 1967).*
(Continued)

*Primary Examiner* — Nathan J Jenness
*Assistant Examiner* — Laura E. Parker
(74) *Attorney, Agent, or Firm* — Bridgeway IP Law Group, PLLC; Sang Ho Lee; Hyun Wooo Shin (57) ABSTRACT

Provided is a composite inner frame multi-bonded barrel, a shell-integrated projectile propellant tank including the same, and a method for manufacturing the barrel and the tank. The shell-integrated projectile propellant tank may include the composite inner frame multi-bonded barrel including a cylinder portion including a plurality of inner frames bonded together; a dome portion including an upper
(Continued)

dome frame and a lower dome frame bonded to an upper end and a lower end of the cylinder portion, respectively; a cylindrical shell coated on an outside of the composite inner frame multi-bonded barrel; and at least one manhole cover sealing a manhole cover coupling hole formed in a center of the upper dome frame or the lower door frame, and the at least one manhole cover has a fluid injection port formed on one side thereof.

4 Claims, 10 Drawing Sheets

(51) Int. Cl.
    *B29L 31/00*         (2006.01)
    *B64G 1/40*         (2006.01)
    *F17C 13/00*       (2006.01)

(52) U.S. Cl.
    CPC ............. *B29L 2031/7156* (2013.01); *F17C 2201/0109* (2013.01); *F17C 2203/012* (2013.01); *F17C 2203/0619* (2013.01); *F17C 2203/066* (2013.01); *F17C 2203/0663* (2013.01); *F17C 2209/22* (2013.01); *F17C 2270/0186* (2013.01); *F17C 2270/0194* (2013.01)

(58) Field of Classification Search
    CPC .......... F17C 2209/22; F17C 2270/0194; F17C 2203/066; F17C 2209/00; B64G 1/402
    USPC ................. 220/560.04, 4.12, 4.13, 4.14
    See application file for complete search history.

(56) References Cited

U.S. PATENT DOCUMENTS

| | | | |
|---|---|---|---|
| 4,036,390 A * | 7/1977 | Morse | B65D 90/08 220/565 |
| 6,220,287 B1 | 4/2001 | Wolf | |
| 6,422,514 B1 | 7/2002 | Clark et al. | |
| 7,036,677 B1 * | 5/2006 | Funck | F17C 1/16 220/581 |
| 7,389,890 B1 | 6/2008 | Hampsten | |
| 9,446,898 B2 | 9/2016 | Aylward | |
| 2004/0050845 A1 * | 3/2004 | Brunacci | B29C 65/02 220/4.14 |
| 2013/0327778 A1 | 12/2013 | Sanders et al. | |
| 2015/0267866 A1 * | 9/2015 | Varrassi | F17C 1/12 220/560.11 |
| 2018/0038547 A1 * | 2/2018 | Hand | F17C 1/16 |
| 2019/0016481 A1 | 1/2019 | Chiku et al. | |

FOREIGN PATENT DOCUMENTS

| | | | |
|---|---|---|---|
| EP | 3348822 A1 | 7/2018 | |
| JP | 2003-080609 A | 3/2003 | |
| JP | 3896416 B2 | 3/2007 | |
| KR | 1998-0057565 B1 | 9/1998 | |
| KR | 10-2000-0045606 A | 7/2000 | |
| KR | 10-0771343 B1 | 10/2007 | |
| KR | 100771343 B1 * | 10/2007 | |
| KR | 10-2015-0003078 A | 1/2015 | |
| KR | 10-1735351 B1 | 5/2017 | |
| RU | 2268210 C2 | 1/2006 | |
| RU | 167124 U1 | 12/2016 | |
| WO | WO-2014035510 A2 * | 3/2014 | ............ B29C 70/24 |

OTHER PUBLICATIONS

English Machine Translation of KR-100771343-B1 (Year: 2007).*
English Machine Translation of CN-109911247-A (Year: 2019).*
Johnson et al., "Structures and Design Phase I Summary for the NASA Composite Cryotank Technology Demonstration Project," Apr. 8-11, 2013, 54th AIAA/ASME/ASCE/AHS/ASC Structures, Structural Dynamics, and Materials Conference (Year: 2013).*
Vickers, "Composite Australia Conference Composite Cryotank Project Structures for Launch Vehicles," Mar. 5, 2013, NASA Marshall Space Flight Center presentation (Year: 2013).*

* cited by examiner

COMPOSITE INNER FRAME MULTI-BONDED BARREL, SHELL-INTEGRATED PROJECTILE PROPELLANT TANK INCLUDING SAME, AND METHOD FOR MANUFACTURING THOSE

TECHNICAL FIELD

The present invention relates to a method for integrally manufacturing a propellant tank mounted on a space launch vehicle and a fuselage shell surrounding the same with a fiber-reinforced composite material, and more particularly, a barrel which is bonded with a plurality of composite inner frames, a composite fuselage shell-integrated projectile propellant tank including same, and a method for manufacturing the barrel and the tank.

BACKGROUND

As interest in the aerospace field increases, research on a launch vehicle that can promote the development of the aerospace field has been actively conducted.

For example, in order to reduce the overall cost and the weight of the propellant tank of the space launch vehicle while maintaining design reliability of an existing metal tank, the National Aeronautics and Space Administration (NASA) in the United States has been conducting various research related to the application of composite materials in collaboration with private companies in the aerospace field.

In particular, for the development of a composite liquefied hydrogen tank, the second generation RLV development and Composite Cryo-tank Technology Demonstration Project (CCTD) under the Space Launch Initiative (SLI) through the National Aerospace Plane (NASP) program and the Single-Stage-to-Orbit (SSTD) launch vehicle X-33 program from 2011 to 2014 have been in progress.

Figure 1:
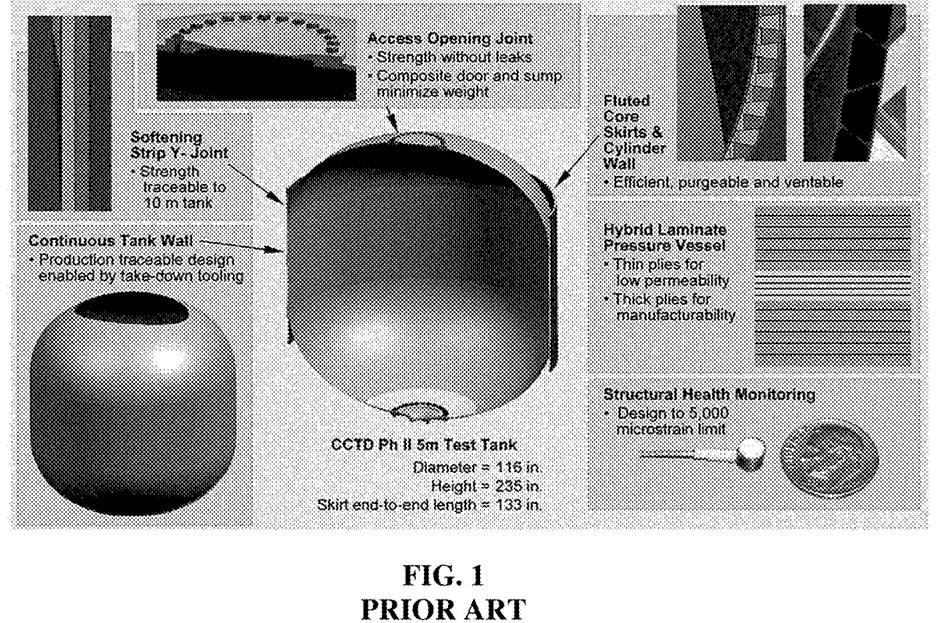
FIG. 1 is a configuration view of a cryogenic tank of a conventional CCTD.

Among them, as illustrated in FIG. 1, a cryogenic tank of the CCTD is configured with a barrel (Continuous Tank Wall), a skirt (shell) (Fluted Core Skirts & Cylinder Wall), a front cover (Access Opening Joint), and a softening strip (Softening Strip Y-joint).

Figure 2:
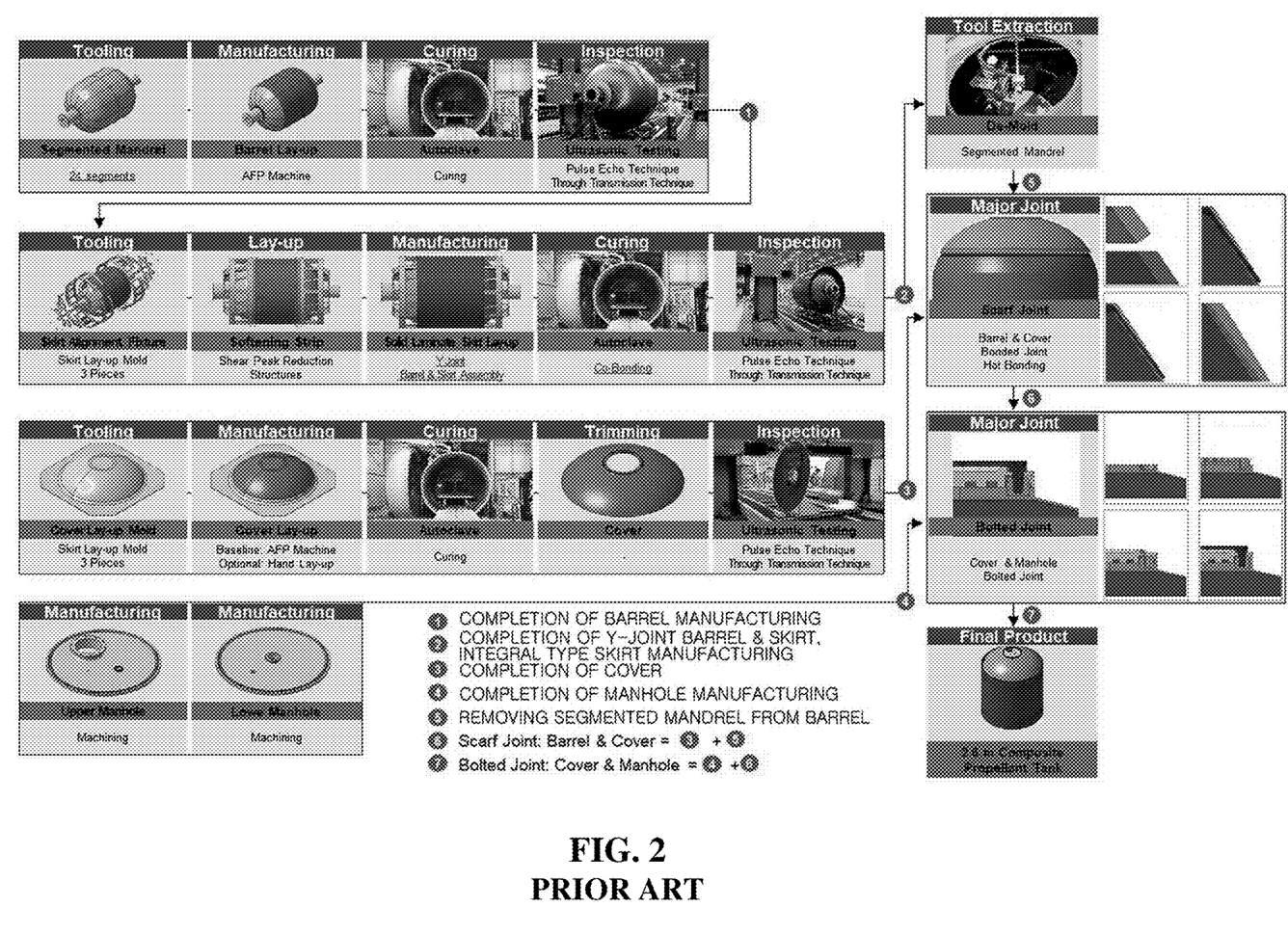
FIG. 2 is a flow chart of manufacturing the cryogenic tank of the CCTD of FIG. 1.

In addition, referring to FIG. 2, a manufacturing process of the cryogenic tank of the CCTD includes a barrel forming step of forming a barrel-shaped mold in which a cylinder portion and a dome portion are integrated with 24 segments, laying-up a material on the cylinder portion of the barrel-shaped mold, and then curing and inspecting the cylinder portion; a skirt-barrel assembly step of assembling a skirt mold on a dome portion of the barrel formed in the barrel forming step, coating and curing the skirt mold with a flutted core-type panel, and inspecting the skirt mold; a step of manufacturing a cover and a manhole; a step of removing the barrel mold and the skirt mold by entering an inside of the skirt-barrel assembly; and a step of coupling the cover and the manhole to the skirt-barrel assembly.

Such conventional cryogenic projectile propellant tank has the following problems:

[1] Since 24 segments are bonded after manufacturing, there are disadvantages in that the process, airtightness, and recovery after use are difficult, and it takes a lot of processing time.

[2] Since the mold is removed after assembling the skirt-barrel, there are disadvantages in that the process is difficult, it takes a lot of processing time, and there is a significant risk because an operator enters the inside of the assembly to operate.

Figure 3A:
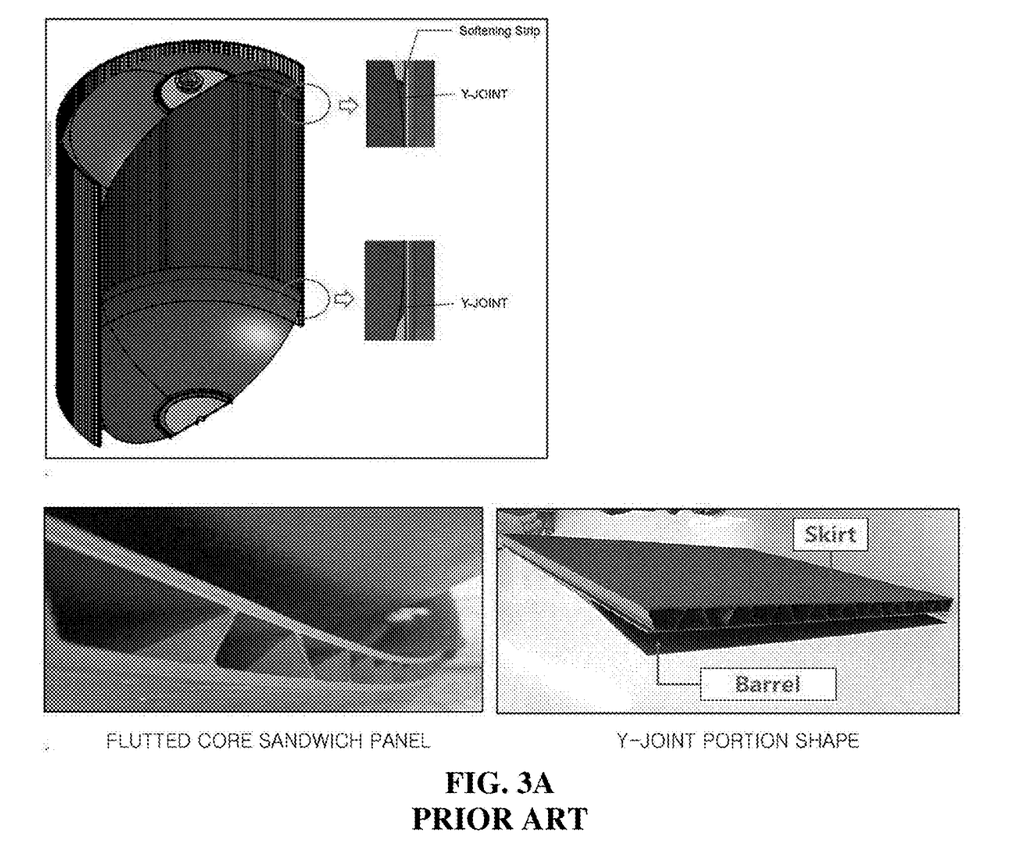
FIGS. 3A and 3B are detailed views of a Y-Joint portion of the cryogenic tank of the CCTD of FIG. 1.

[3] Referring to FIG. 3A, in the skirt-barrel assembly, since the barrel is formed of the dome portion having a curvature portion, a Y-shaped gap (Y-joint portion) is generated between the skirt and the barrel, and this gap is a region where stress concentration occurs, thereby being a most vulnerable portion.

Figure 3B:
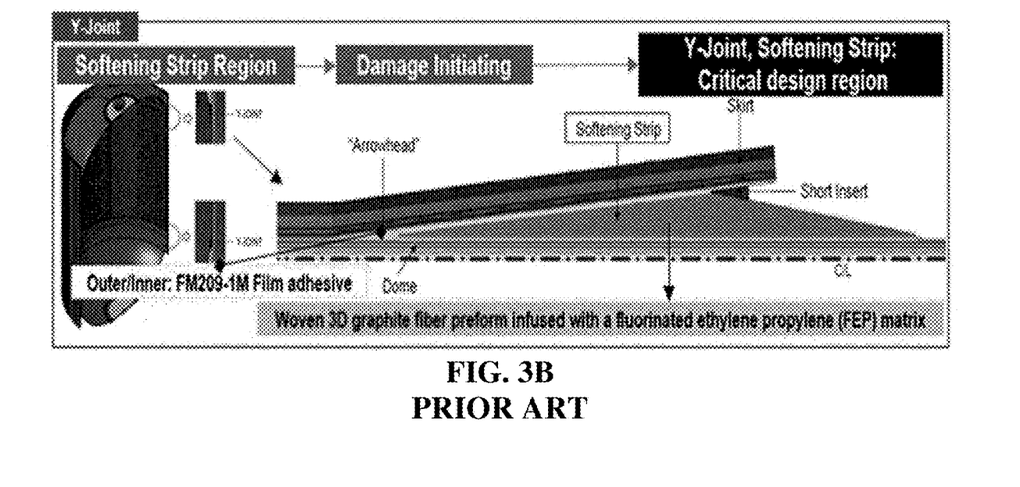

For this reason, conventionally, as illustrated in FIG. 3B, the weakness of the Y-joint portion is solved in such a manner that a triangular softening strip is inserted into the skirt-barrel assembly, and a short insert is inserted into the remaining gap.

However, this measure has a disadvantage in that it takes a lot of processing time, the cost is increased, and there is a high possibility of defects due to a large number of bonded parts.

[4] In a case of a tank that stores a liquid such as a fuel or a propellant, a structure is required to prevent the contents from fluctuating. However, the conventional cryogenic tank (projectile propellant tank) does not have such a configuration.

Therefore, there is a need to develop a projectile propellant tank that can solve the problems described above.

SUMMARY OF INVENTION

Technical Problem

The present invention is made in order to solve the problems described above, and an object of the present invention is to provide a composite inner frame multi-bonded barrel, a shell-integrated projectile propellant tank including same, and a method for manufacturing those in which in order to decrease a process time and manufacturing costs, simplify a process, increase the safety of an operator, and minimize defects, a plurality of inner frames are manufactured in a ring shape and a dome shape, and then bonded together after a mold is removed in advance, a shell-integrated projectile propellant tank is manufactured by using a barrel that forms a baffle structure that prevents fluctuation at the time of bonding, and a softening strip, which is formed in a conventional insert form, is formed in a Y-joint portion that is a weak portion between the barrel and the shell (skirt), so as to be integrated with the barrel during the manufacture of the barrel.

Solution to Problem

A composite inner frame multi-bonded barrel according to an example of the present invention for solving the problems described above, the barrel may include: a cylinder portion that is configured by bonding a plurality of inner frames; and a dome portion configured of dome frames bonded to upper and lower ends of the cylinder portion.

Here, the inner frame and the dome frame may form a baffle structure by secondary bonding through a flange protruding inside in each end thereof.

In addition, a curvature of the dome frame may be formed such that a ratio of short axis/long axis may be 0.76 to 0.91 based on an elliptical composite inner frame multi-bonded barrel.

Next, a shell-integrated projectile propellant tank including a composite inner frame multi-bonded barrel according to an example of the present invention may include: the composite inner frame multi-bonded barrel; a cylindrical shell coated on an outside of the composite inner frame multi-bonded barrel; and a manhole cover that seals a manhole cover coupling hole formed in a center of the dome frame and has a fluid injection port formed on one side thereof.

Further, on a side of the dome frame, a softening strip laterally protruding and integral with the dome frame may be formed along a circumference.

Further, the shell may be formed in a solid laminate type formed by multiply overlapping a composite material.

Next, a method for manufacturing a composite inner frame multi-bonded barrel, the method may include: a step of manufacturing a plurality of inner frames and two dome frames; a step of performing a non-destructive inspection on the manufactured inner frames and dome frames; and a step of forming a barrel by secondary bonding of the plurality of inner frames and the two dome frames.

Next, a method for manufacturing a shell-integrated projectile propellant tank including a composite inner frame multi-bonded barrel, the method may include: a step of mounting a shell mold on the composite inner frame multi-bonded barrel; a step of forming a barrel-shell assembly by laying-up and co-bonding a composite material to the shell mold; a step of inspecting the barrel-shell assembly after curing; and a step of completing the propellant tank by coupling a manhole cover to the barrel of the barrel-shell assembly for which the inspection is completed.

Advantageous Effects

The shell-integrated projectile propellant tank according to an example of the present invention is manufactured by making a plurality of frames in a ring shape and a dome shape, and then bonded together after the mold is removed and using the barrel that forms a baffle structure that prevents fluctuation at the time of bonding. The softening strip formed in a conventional insert form is formed in the Y-joint portion that is a weak portion between the barrel and the shell, so as to be integrated with the barrel during the manufacture of the barrel. Therefore, there are advantages in that a process time and manufacturing costs can be decreased, a process can be simplified, the safety of an operator can be increased, defects can be minimized, the fastening of the Y-joint portion can be improved, and the propulsion operation of the projectile is safe.

BEST MODE FOR INVENTION

A composite inner frame multi-bonding barrel according to an example of the present invention may include a cylinder portion that is configured by bonding a plurality of inner frames, and a dome portion configured of dome frames bonded to upper and lower ends of the cylinder portion.

A shell-integrated projectile propellant tank including a composite inner frame multi-bonded barrel according to an example of the present invention may include: the composite inner frame multi-bonded barrel; a cylindrical shell coated on an outside of the composite inner frame multi-bonded barrel; and a manhole cover that seals a manhole cover coupling hole formed in a center of the dome frame and has a fluid injection port formed on one side thereof.

A method for manufacturing a composite inner frame multi-bonded barrel according to an example of the present invention may include a step of manufacturing a plurality of inner frames and two dome frames; a step of performing a non-destructive inspection on the manufactured inner frames and dome frames; and a step of forming a barrel by secondary bonding of the plurality of inner frames and the two dome frames.

A method of manufacturing a shell-integrated projectile propellant tank including a composite inner frame multi-bonded barrel according to an example of the present invention may include: a step of mounting a shell mold on the composite inner frame multi-bonded barrel; a step of forming a barrel-shell assembly by laying-up and co-bonding a composite material to the shell mold; a step of inspecting the barrel-shell assembly after curing; and a step of completing the propellant tank by coupling a manhole cover to the barrel of the barrel-shell assembly for which the inspection is completed.

MODES FOR CARRYING OUT THE INVENTION

Hereinafter, the description of the present invention with reference to the drawings is not limited to a specific embodiment, and various transformations may be applied and various examples may be provided. In addition, the content described below should be understood to include all conversions, equivalents, and substitutes included in the spirit and scope of the present invention.

In the following description, terms such as first and second are terms used to describe various configuration elements, are not limited to meanings thereof, and are used only for the purpose of distinguishing one configuration element from another configuration element.

The same reference numbers are used throughout the present specification denote the same configuration elements.

Singular expressions used in the present invention include plural expressions unless the context clearly indicates otherwise. In addition, terms such as "include", "provide" or "have" described below are intended to designate the presence of features, numbers, steps, operations, configuration elements, parts, or combinations thereof described in the specification. It should be understood that a possibility of the presence or addition of one or more other features, numbers, steps, operations, configuration elements, parts, or combinations thereof is not preliminarily excluded.

Hereinafter, a composite inner frame multi-bonded barrel, a shell-integrated projectile propellant tank including same, and a method for manufacturing those according to an example of the present invention will be described in detail with reference to FIGS. 4 to 12.

Figure 4:
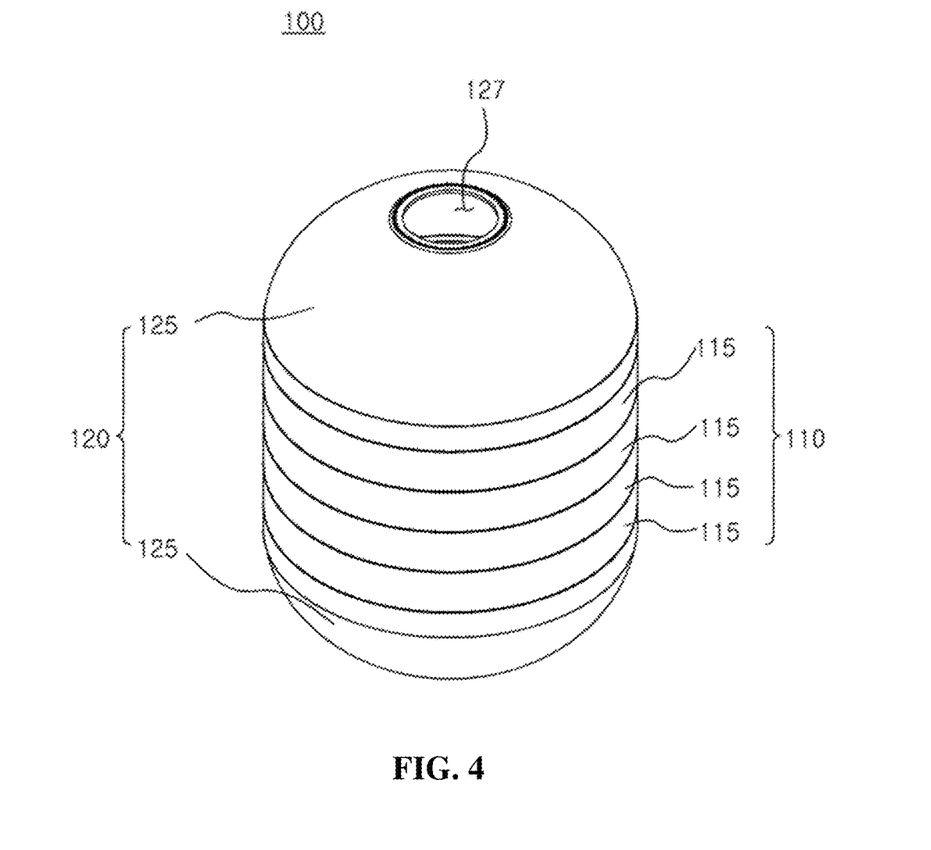
FIG. 4 is a perspective view of a composite inner frame multi-bonded barrel according to an example of the present invention.
Figure 5:
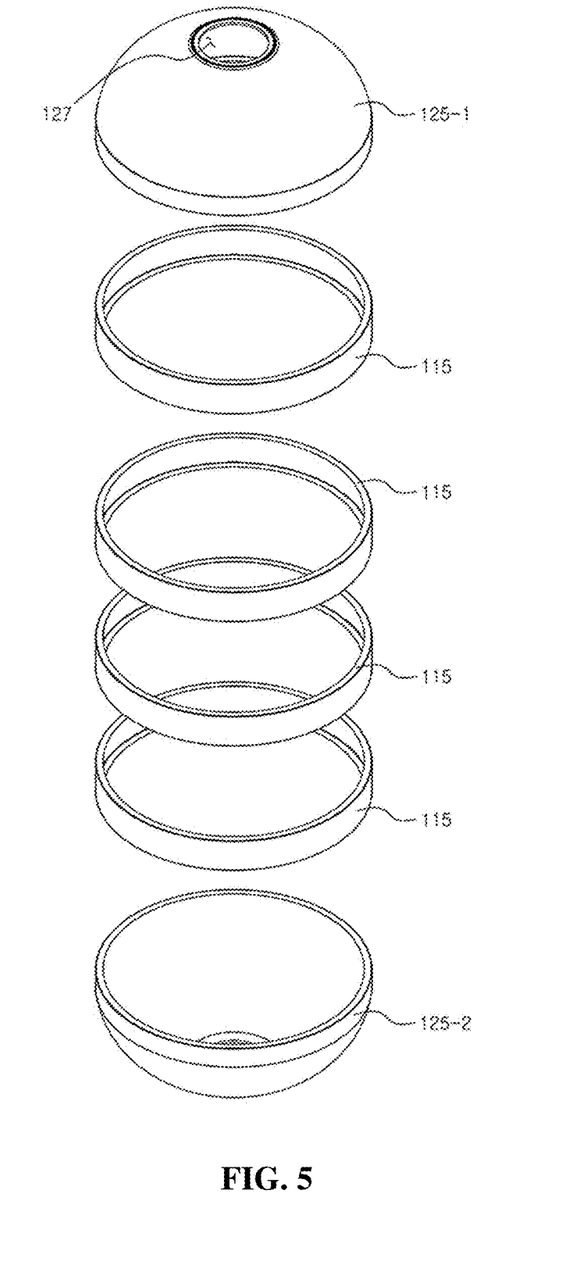
FIG. 5 is an exploded perspective view of the composite inner frame multi-bonded barrel according to the example of the present invention.
Figure 6:
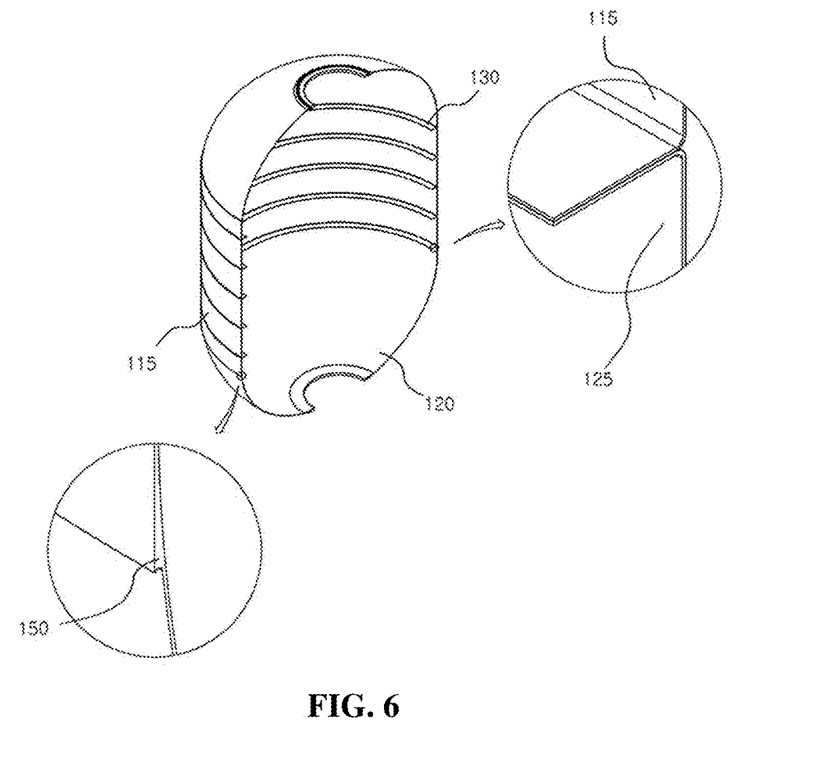
FIG. 6 is a sectional perspective view of the composite inner frame multi-bonded barrel according to the example of the present invention.

FIG. 4 is a perspective view of the composite inner frame multi-bonded barrel according to an example of the present invention, FIG. 5 is an exploded perspective view of the composite inner frame multi-bonded barrel according to the example of the present invention, and FIG. 6 is a sectional perspective view of the composite inner frame multi-bonded bonded barrel according to the example of the present invention.

With reference to FIGS. 4 to 6, a composite inner frame multi-bonded barrel 100 according to an example of the present invention may be configured to include a cylinder portion 110 and a dome portion 120.

Specifically, the cylinder portion 110 has a cylindrical structure, and may be configured by bonding a plurality of ring-shaped inner frames 115. Here, four ring-shaped inner frames 115 may be bonded to each other but this is exemplary and is not limited to the example, and only a plurality of rings may be formed as described above.

In addition, the bonding may be provided by an adhesive (adhesive bonding joint). However, the bonding method is a preferred form and is not necessarily limited thereto, and may be formed by a fastening type such as welding or rivet coupling, if necessary.

In addition, in the above description, although the cylinder portion 110 is exemplified as a ring shape having a predetermined length, but may have a cylindrical shape having a length substantially longer than that of the ring shape. That is, there is a volume required for the propellant tank in assembling the projectile, because when it is intended to be formed only with two ring-shaped inner frames 115, it should be formed in a cylindrical shape.

That is, the inner frames 115 constituting the cylinder portion 110 may be a ring shape or a cylinder in which a hollow portion is formed therein.

The dome portion 120 is a cover of the cylinder portion 110 and may be configured of dome frames 125 that are bonded to an upper end and a lower end of the cylinder portion 110. That is, the dome portion 120 may be configured of a dome-shaped upper dome frame 125-1 and a dome-shaped lower dome frame 125-2.

The dome frame 125 may have a flat end portion constituting the dome, and a manhole cover coupling hole 127 may be formed in a center thereof. This is provided for coupling to a manhole cover 300 to be described later. A detailed description of the coupling to the manhole cover 300 will be described later.

The inner frame 115 of the cylinder portion 110 and the dome frame 125 of the dome portion 120 described above may be bonded to each other to form the barrel of the present invention, where the bonding between the inner frame 115 and the dome frame 125 forms a bonding end, that is, a flange 130 protruding inside in each end of the inner frame 115 and the dome frame 125 to be capable of secondary bonding.

That is, referring to the drawings, the ring-shaped inner frame 115, on which the flange 130 is formed, has a 'concave' cross-section in a circular shape.

The secondary bonding structure between the inner frame 115 and the dome frame 125 using the flange 130 may increase a bonding strength by increasing a bonding area, and also has an effect of forming a baffle structure. The baffle structure is a structure for preventing the contents such as a liquid contained inside the tank from fluctuating, and the flange 130 interferes with the fluctuation of the liquid, thereby capable of preventing a propulsion resistance, orbit deviation, or the like, and exhibiting a sloshing reduction effect.

On the other hand, the composite inner frame multi-bonded barrel 100 of the present invention formed by assembling the cylinder portion 110 and the dome portion 120 may form an elliptical shape when the cylinder portion 110 and the dome portion 120 are assembled. Here, the dome frame 125 of the dome portion 120 may have a curvature where a ratio (elliptical ratio) of short axis b and long axis a is 0.76 to 0.91 based on the elliptical barrel. Here, if the ratio of the short axis b and long axis a of the curvature of the dome frame 125 based on the elliptical barrel is less than 0.76, buckling may occur, and if it exceeds 0.91, an internal volume requirement may not be met.

The composite inner frame multi-bonded barrel 100 according to the example of the present invention configured as described above has an advantage in that a baffle structure capable of preventing liquid from fluctuating can be formed while providing a high bonding strength. In addition, by assembling a plurality of inner frames, there are advantages in that the process can be simplified, a design for reducing or expanding a volume thereof can be easily modified, and manufacturing costs and a weight of the mold can be reduced.

On the other hand, the shell-integrated projectile propellant tank according to the example of the present invention may be manufactured by including the composite inner frame multi-bonded barrel 100 described above. This will be described with reference to FIGS. 7 to 11B.

Figure 7:
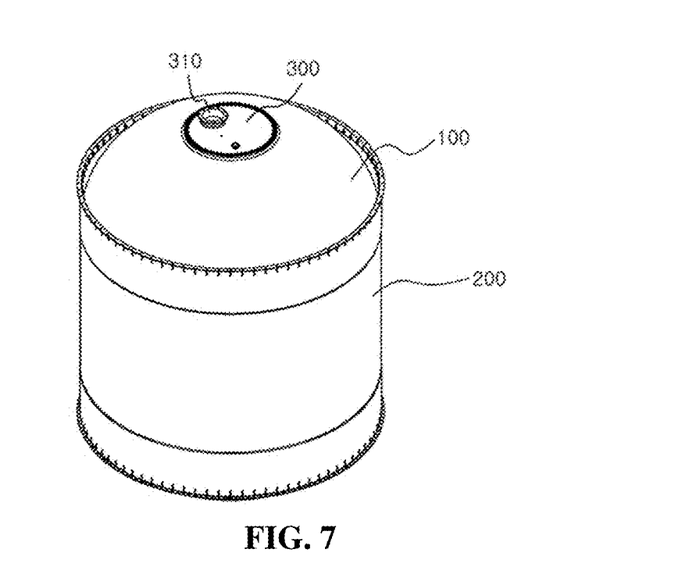
FIG. 7 is a perspective view of a shell-integrated projectile propellant tank according to an example of the present invention.
Figure 8:
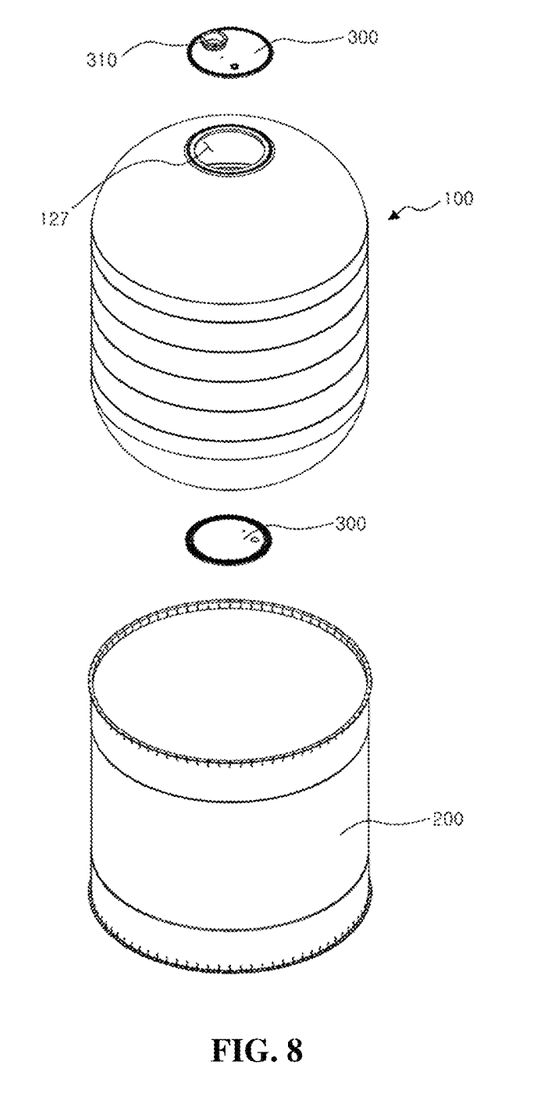
FIG. 8 is an exploded perspective view of the shell-integrated projectile propellant tank according to the example of the present invention.
Figure 9:
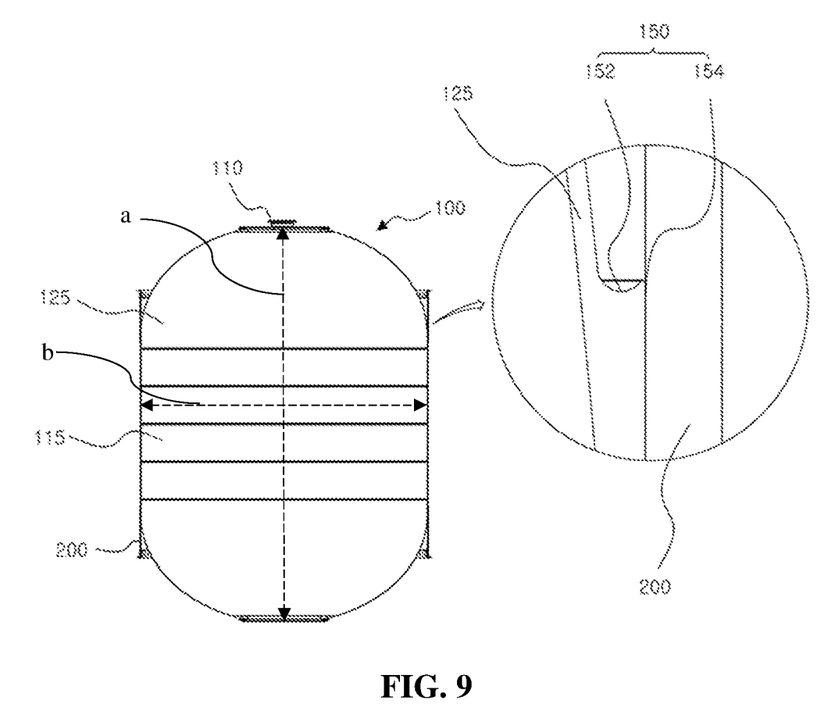
FIG. 9 is an enlarged view of a Y-Joint portion of the shell-integrated projectile propellant tank according to an example of the present invention.
Figure 10:
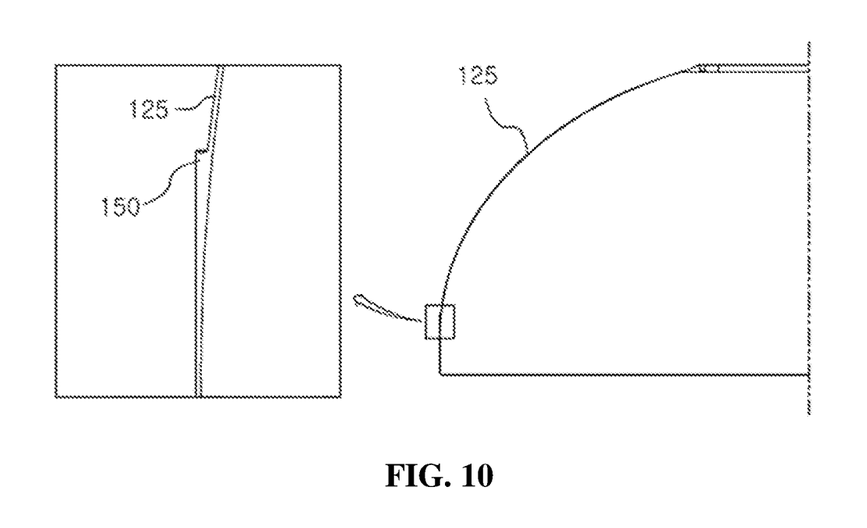
FIG. 10 is a detailed view of a dome frame that is one configuration of the shell-integrated projectile propellant tank of FIG. 9.
Figure 11A:
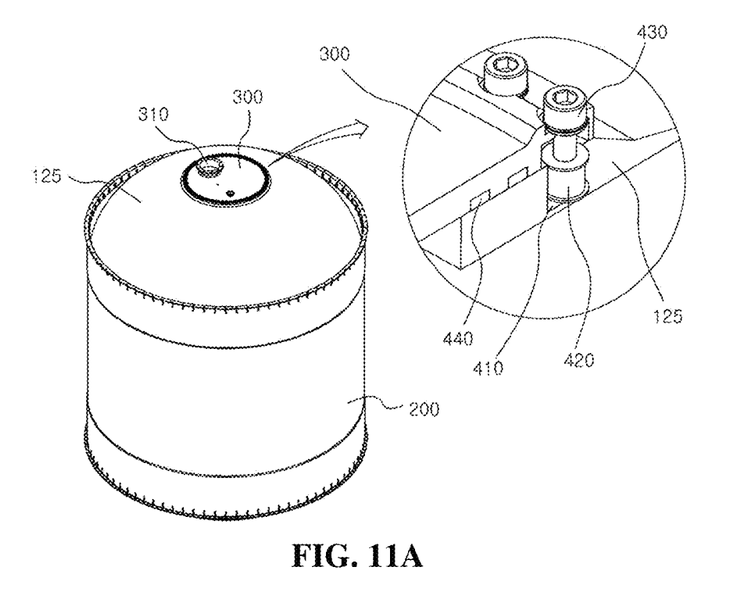
FIGS. 11A and 11B are detailed views of a manhole cover fastening portion of the shell-integrated projectile propellant tank according to an example of the present invention.
Figure 11B:
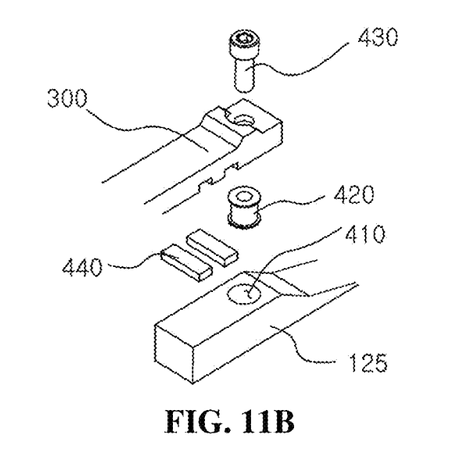

FIG. 7 is a perspective view of the shell-integrated projectile propellant tank according to the example of the present invention, FIG. 8 is an exploded perspective view of the shell-integrated projectile propellant tank according to the example of the present invention, FIG. 9 is an enlarged view of the Y-Joint portion of the shell-integrated projectile propellant tank according to the example of the invention, FIG. 10 is a detailed view of a dome frame which is a configuration of the shell-integrated projectile propellant tank of FIG. 9, and FIGS. 11A and 11B are detailed views of a manhole cover fastening portion of the shell-integrated projectile propellant tank according to the example of the invention.

Referring to FIGS. 7 to 11B, the shell-integrated projectile propellant tank according to the example of the present invention may include the composite inner frame multi-bonded barrel 100, the shell 200, and the manhole cover 300.

Here, since the composite inner frame multi-bonded barrel 100 is the same as the composite inner frame multi-bonded barrel 100 described with reference to FIGS. 1 to 3B, a detailed description thereof will be omitted.

The shell 200 may be formed in a cylindrical shape in a configuration of being coated on the outside of the composite inner frame multi-bonded barrel 100. Here, the shell 200 laterally protrudes from the side of the cylinder portion 110 and the dome frame 125 of the composite inner frame multi-bonded barrel 100, and may be bonded to a softening strip 150 formed along a circumference thereof to be abutted.

That is, the softening strip 150 laterally protruding on the side of the dome frame 125 of the composite inner frame multi-bonded barrel 100 may be formed to be integrated with the dome frame 125 along the circumference.

This, in the structure of the dome portion 120 forming a curved surface, forms a Y-joint portion, which is a weak portion where stress is concentrated with the shell 200. Therefore, it can have an effect of reinforcing the Y-joint portion without other additional insertion members. In addition, due to this, it is possible to reduce the process time and improve the safety of the structure by forming a wide bonding area.

Here, the protruding shape of the softening strip 150 may be formed of a concave portion 152 and an inclined portion 154 extending to be downwardly inclined from the concave portion 152, but is not necessarily limited thereto and may be a shape protruding at a right angle.

In addition, the shell 200 may be formed in a solid laminate type formed by multiply overlapping the composite material.

This may increase a weight per volume compared to a case where the shell constituting the conventional projectile propellant tank is formed of multiple hollow and flutted core type panels for weight reduction, but it may be further suitable depending on the capacity of the tank when considering an appropriate shell thickness that satisfies the internal volume and structural stability of the propellant tank.

In addition, there are advantages in that the bonding strength between the barrel and the shell is superior through the co-bonding process in which a mold is mounted on the composite inner frame multi-bonded barrel 100 to laminate the shell compared to that of the conventional process, necessary tooling can be simplified, and the manufacturing process can also be simplified.

Further, the manhole cover 300 may be coupled to the center of the dome frame 125 to seal the manhole cover coupling hole 127. In addition, the manhole cover 300 may have a fluid injection port 310 formed on one side. Here, the manhole cover 300 may be bolted to the dome frame 125, the structure thereof may be fastened by forming a plurality of insertion holes 410 along a circumference of the manhole cover coupling hole 127 in the dome frame 125, inserting an insert 420 into the insertion hole 410, and then injecting an adhesive to be cured, seating the manhole cover 300 on an upper end thereof, and inserting a bolt 430 into the insert 420.

In addition, one or more seals 440 may be mounted between the dome frame 125 and the manhole cover 300 to seal a gap therebetween.

Hereinafter, a method for manufacturing the composite inner frame multi-bonded barrel and a method for manufacturing the shell-integrated projectile propellant tank including the composite inner frame multi-bonded barrel according to the example of the present invention will be described with reference to FIG. 12.

Figure 12:
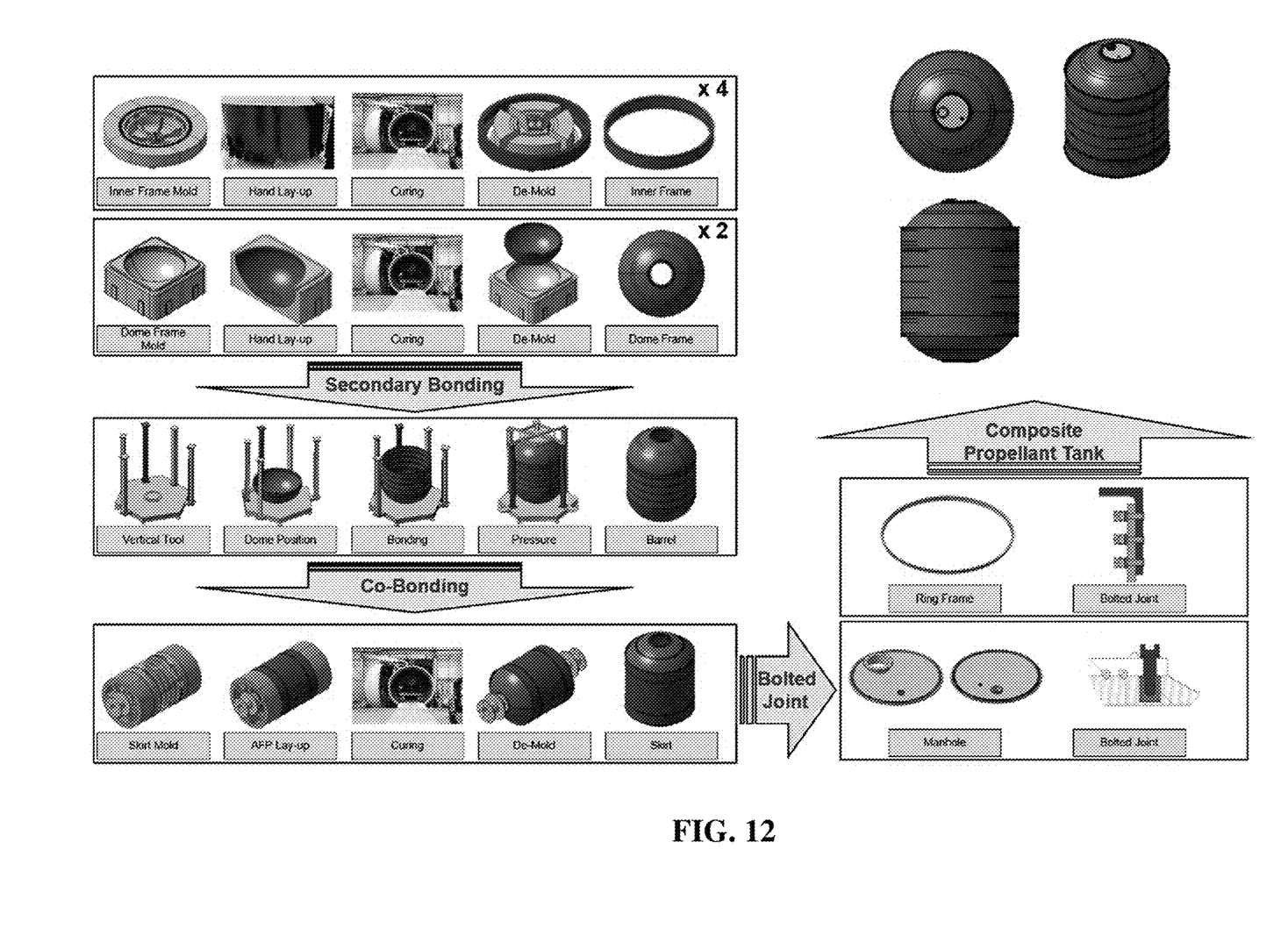
FIG. 12 is a flow chart of manufacturing of the shell-integrated projectile propellant tank according to an example of the present invention.

FIG. 12 is a flow chart of manufacturing for the shell-integrated projectile propellant tank according to the example of the present invention.

Referring to FIG. 12, the method for manufacturing the composite inner frame multi-bonded barrel according to the example of the present invention may include a step of manufacturing a plurality of inner frames 115 and two dome frames 125, a step of performing a non-destructive inspection on the manufactured inner frames 115 and dome frame 125, and a step of forming the barrel by secondary bonding of the plurality of inner frames 115 and the two dome frames 125.

Here, the inner frame may have a ring or a cylinder shape.

In addition, the step of manufacturing the plurality of inner frames may include a first step of laying-up a composite material on a mold, a second step of curing the laminated composite material to form the inner frame 115, a third step of removing the mold of the inner frame 115 formed as described above, a fourth step of manufacturing the plurality of inner frames 115 by repeating the first to third steps, and a fifth step of inspecting the manufactured inner frames 115.

Here, the mold forming the inner frame may be configured by being formed in a ring shape, and assembling a plurality of divided bodies. In this case, the plurality of divided bodies may be formed of divided bodies having the same shape, but preferably, they may be cut in a cross shape (+) in all directions based on the center of the mold as illustrated in the drawing. Thus, there is an advantage in that if one of the plurality of divided bodies is removed in the third step, the remaining divided bodies can be easily removed.

In addition, in the step of manufacturing the two dome frames, the dome frame 125 may be manufactured by a dome frame mold which is recessed in a hemispherical shape when the dome frame 125 is manufactured, and in which a space is also provided where the softening strip positioned in the Y-joint portion when forming the barrel-shell assembly is formed on the side.

Thus, the softening strip may be manufactured integrally with the dome frame 125.

The manufacturing of the dome frame 125 may be carried out in a manner in which the composite material is laminated on the inner surface of the dome frame mold recessed in the hemispherical shape by using an AFP device, and then cured to remove the mold in that state.

In the step of forming the barrel by bonding the plurality of inner frames 115 and the two dome frames 125, the bonding may be performed by using a vertical tool including a polygonal lower support portion and a plurality of vertical poles vertically extending from the lower support portion.

Specifically, the lower dome frame 125-2 is fixed to a center of the vertical tool, and then the plurality of inner frames 115 may be repeatedly stacked and bonded one by one to finally bond up to the upper dome frame 125-1. Thereafter, a pressurizing device may be installed on the vertical pole so that the adhesive bonding each surface of the dome frame and the inner frame is more evenly spread, and then the upper dome frame 125-1 may be pressed downward to complete the barrel.

In addition, the completed barrel may be finally inspected and finished, and an ultrasonic inspection may be performed at the time of inspection. However, since the inner frame 115 and the dome frame 125 are respectively subjected to the non-destructive inspection as described above, the final inspection of the barrel may not necessarily be performed.

In such a method for manufacturing for the composite inner frame multi-bonded barrel, there are effects that since the inner frames having the same shape are made and manufactured, a jig and a fixture can be simplified, the assembly can be simplified, so that the inner frame can be manufactured by using a small tool, and in particular, there is no need to remove the mold after completion of the barrel.

In addition, the method for manufacturing the shell-integrated projectile propellant tank including the composite inner frame multi-bonded barrel according to the example of the present invention is performed by integrally manufacturing a barrel, a softening strip, and a shell by covering the shell, and may include a step of mounting a shell mold on the composite inner frame multi-bonded barrel; a step of forming a barrel-shell assembly by laying-up and co-bonding a composite material to the shell mold; a step of inspecting the barrel-shell assembly after curing; and a step of completing the propellant tank by coupling a manhole cover to the barrel of the barrel-shell assembly for which the inspection is completed.

Here, as described above, in the barrel-shell assembly, in a state where the softening strip laterally protruding is formed along the circumference on the side of the dome frame of the composite inner frame multi-bonded barrel, the barrel is bonded to the shell, and thereby the process time can be reduced and the safety of the structure can be improved by widely forming the bonding area.

In addition, when the composite material is laid-up on the shell mold, the shell mold (skirt alignment fixture (SAF)) can be mounted on an automated fiber placement (AFP) equipment adapter to be laid-up, and an ultrasonic test may be performed to the barrel-shell assembly after curing.

In addition, as described above, the coupling of the manhole cover 300 is performed by using the insert 420 and airtight by using the seal 440, so that there is an advantage of high airtightness.

In addition, the shell-integrated projectile propellant tank of the present invention has an advantage of forming strong durability against various stress actions because the fuselage shell is coated with a fiber-reinforced composite material in a state where the barrel, the softening strip, and the shell are integrally manufactured.

Examples of the present invention are described above with reference to the accompanying drawings, but those of ordinary skill in the art will understand that the present invention can be implemented in other specific forms without changing the technical spirit or essential features. Therefore, the examples described above are illustrative and non-limiting in all respects.

The invention claimed is:

1. A composite inner frame multi-bonded barrel comprising:
   a cylinder portion having a first end and a second end and comprising a plurality of inner frames bonded together; and
   a dome portion comprising a first dome frame and a second dome frame bonded at a rim end thereof to the first end and the second end of the cylinder portion, respectively,
   wherein a first softening strip laterally protruding outward along a circumference of the first dome frame and a second softening strip laterally protruding along a circumference of the second dome frame are integrated with the first dome frame and the second dome frame, respectively, wherein the first softening strip has a first concave portion concaving in a direction toward the second end of the cylinder portion and the second softening strip has a second concave portion curved in a direction toward the first end of the cylinder portion,
   wherein each of the first dome frame and the second dome frame have a flat end portion disposed opposite to the rim end bonded to the first end and the second end of the cylinder portion, respectively, and a manhole cover coupling hole is disposed at a center of each of the flat end portion, and
   wherein a curvature of the first dome frame and the second dome frame defines the composite inner frame multi-bonded barrel that has a short axis/long axis ratio of 0.76 to 0.91.

2. The composite inner frame multi-bonded barrel of claim 1,
   wherein each of the plurality of inner frames comprises at least one flange protruding inward at each end thereof, and the each of the first dome frame and the second dome frame comprises at least one flange protruding inward at the rim end thereof,
   wherein each of the at least one flange of the plurality of inner frames, the first dome frame, and the second dome frame defines a bonding area, and each of the at least one flange is configured to bond with a bonding area of another flange by secondary bonding, and
   wherein bonded flanges of the plurality of inner frames, the first dome frame, and the second dome frame define a baffle structure by the secondary bonding.

3. A shell-integrated projectile propellant tank comprising:
   the composite inner frame multi-bonded barrel of claim 1,
   a cylindrical shell disposed on an outside of the composite inner frame multi-bonded barrel; and
   at least one manhole cover configured to seal the manhole cover coupling hole of the first dome frame or the second dome frame,
   wherein the at least one manhole cover has a fluid injection port formed on one side thereof.

4. The composite inner frame multi-bonded barrel of claim 1,
   wherein the plurality of inner frames comprises four ring-shaped inner frames.

* * * * *